(12) United States Patent
Zhang et al.

(10) Patent No.: US 10,036,570 B2
(45) Date of Patent: Jul. 31, 2018

(54) HEAT TRANSFER BAFFLE ARRANGEMENT FOR FUEL-BURNING WATER HEATER

(71) Applicant: Rheem Manufacturing Company, Atlanta, GA (US)

(72) Inventors: Qian Zhang, Montgomery, AL (US); Jiang Yin, Montgomery, AL (US); Gary Flatness, Montgomery, AL (US); David Gibbons, Pratville, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 414 days.

(21) Appl. No.: 14/596,435

(22) Filed: Jan. 14, 2015

(65) Prior Publication Data

US 2016/0201944 A1    Jul. 14, 2016

(51) Int. Cl.
  *F24H 1/20* (2006.01)
  *F23M 9/10* (2006.01)
  *F23M 9/00* (2006.01)

(52) U.S. Cl.
  CPC .............. *F24H 1/205* (2013.01); *F23M 9/003* (2013.01); *F23M 9/10* (2013.01)

(58) Field of Classification Search
  CPC ...... F24H 1/205; F24H 9/0026; F24H 9/0031; F23M 9/003; F23M 9/10; F28F 13/12; B01F 5/0616
  USPC .............................................. 122/18.31, 44.2
  See application file for complete search history.

(56) References Cited

U.S. PATENT DOCUMENTS

| 2,091,274 | A | * | 8/1937 | Eggleston | ............... F24H 3/006 122/155.2 |
| 2,541,175 | A | * | 2/1951 | Osterheld | ............... F24H 1/205 122/155.2 |
| 3,942,765 | A | * | 3/1976 | Henrickson | ........... B01F 5/0616 366/336 |
| 4,165,963 | A | | 8/1979 | Nozaki | |
| 4,577,681 | A | * | 3/1986 | Hughes | .................... F23M 9/00 138/38 |
| 4,676,199 | A | | 6/1987 | Daugirda et al. | |
| 5,094,224 | A | * | 3/1992 | Diesch | ..................... F28F 1/42 126/110 R |
| 5,197,665 | A | | 3/1993 | Jenson et al. | |

(Continued)

*Primary Examiner* — Steven B McAllister
*Assistant Examiner* — Steven Anderson, II
(74) *Attorney, Agent, or Firm* — King & Spalding LLP (57) ABSTRACT

A baffle arrangement disposed within the exhaust flue of a fuel-burning water heater promotes heat transfer from exhausted combustion by-products to the water storage chamber. The baffle arrangement has an elongate planar base and plural exhaust-directing fins spaced along opposite sides of the base. Each fin is a planar body extending perpendicularly from the base at an acute upward angle from a longitudinal centerline to a respective side of the base. The fins deflect combustion by-products laterally outwardly within the flue to promote heat transfer. The fins are of selected configurations generally increasing in surface area upwardly along the planar base for selectively controlling pressure drop within the exhaust flue. Hanger tabs project outwardly from the upper end of the base to suspend the baffle arrangement within the flue. The planar base, hanger tabs and exhaust-directing fins are formed integrally from a unitary body of sheet metal.

24 Claims, 4 Drawing Sheets

(56) References Cited

U.S. PATENT DOCUMENTS

| | | | | |
|---|---|---|---|---|
| 5,544,625 | A | * | 8/1996 | Rivern .................. F23M 9/003 122/155.2 |
| 5,697,330 | A | | 12/1997 | Yetman et al. |
| 5,950,573 | A | * | 9/1999 | Shellenberger ......... F23D 14/82 122/18.31 |
| 6,053,130 | A | * | 4/2000 | Shellenberger ......... F24H 9/205 110/162 |
| 6,286,465 | B1 | | 9/2001 | Hughes et al. |
| 6,354,248 | B1 | * | 3/2002 | Bourke .................. F24H 1/205 122/155.2 |
| 7,000,572 | B1 | * | 2/2006 | Schimmeyer ............. F22B 7/18 122/155.2 |
| 7,360,506 | B2 | | 4/2008 | Shellenberger et al. |
| 7,458,341 | B2 | | 12/2008 | Lannes |
| 8,541,721 | B2 | * | 9/2013 | Moskal .................. B21D 31/02 126/400 |
| 8,807,093 | B2 | * | 8/2014 | Steinhafel ................ F24H 1/00 122/135.3 |
| 2001/0035135 | A1 | * | 11/2001 | Hughes .................. F23M 9/003 122/155.2 |
| 2007/0186872 | A1 | * | 8/2007 | Shellenberger ........... F23G 7/07 122/4 D |
| 2011/0214621 | A1 | | 9/2011 | Boros et al. |

\* cited by examiner

HEAT TRANSFER BAFFLE ARRANGEMENT FOR FUEL-BURNING WATER HEATER

FIELD OF THE INVENTION

The present invention relates generally to water heaters and especially to exhaust flue systems used in fuel-burning water heaters, such as water heaters which burn natural gas or propane gas. More particularly, the present invention relates to baffle arrangements used in the exhaust flues of fuel-burning water heaters to promote heat transfer to the body of water being heated.

BACKGROUND OF THE INVENTION

Tank-style water heaters generally comprise a water storage container or tank with water inlet and outlet connections and with a thermostatically controlled heating source to heat a body of contained water to, and maintain the water at, a predetermined temperature. Electricity or natural or propane gas are the most common heat sources used for both residential and commercial water heaters.

In electric water heaters, the heating element is commonly submerged within the water tank to apply heat directly to the water. By contrast, gas-fueled water heaters have a separate combustion chamber disposed immediately beneath the water tank, in which a gas burner is situated to apply heat to the tank for heating the water contained therein. In turn, provision must be made for exhausting the by-products of the fuel combustion process. For this purpose, substantially all fuel-burning water heaters are equipped with an exhaust flue extending upwardly from the combustion chamber through the water tank and outwardly therefrom for exhausting the combustion by-products. This configuration provides the additional benefit of providing supplementary heating to the contained water as the hot combustion by-products travel upwardly through the flue.

Because the natural chimney effect of rising combustion by-products within an exhaust flue provides relatively inefficient heat exchange to the surrounding water within a water heater storage tank, it has become commonplace to provide a baffle arrangement within the exhaust flues of fuel-burning water heaters to interrupt natural laminar flow of the by-products and thereby increase residence time of combustion by-products within the exhaust flue to obtain increased heat transfer to the surrounding water. While such baffle arrangements are generally effective to accomplish greater heat exchange than in water heaters without such baffle arrangements, known baffle arrangements have disadvantages. Many known baffle arrangements require welding of individual component parts which undesirably add to the overall cost of water heaters. Other baffle arrangements impose an undesirably higher pressure drop across the height of the exhaust flue. Especially in water heaters that rely upon a natural upward thermal draft for exhaustion of combustion by-products, the hydrostatic pressure naturally occurring along the height of the exhaust flue may be quite small, and accordingly, a baffle arrangement imposing a greater pressure drop can impede proper exhaust of combustion by-products and risk a dangerous build up of carbon dioxide in the ambient environment surrounding the water heater.

SUMMARY OF THE INVENTION

The present invention seeks to provide a baffle arrangement for the exhaust flue of a fuel-burning water heater which addresses the disadvantages of known baffle arrangements.

The present invention is basically applicable to fuel-burning water heaters which comprise a housing defining a water storage chamber for containing a quantity of water to be heated and a combustion chamber located beneath the water storage chamber, an inlet extending through the housing into the storage chamber for delivering water into the storage chamber for heating, an outlet extending through the housing from the storage chamber for discharging heated water from the storage chamber, a fuel burner disposed in the combustion chamber for receiving and combusting a mixture of fuel and air for heating water contained in the water storage chamber, and an exhaust flue extending from the combustion chamber vertically through the water storage chamber and outwardly from the housing for exhausting combustion by-products generated by combustion of the fuel-and-air mixture.

According to one aspect of the present invention, a baffle arrangement is disposed within the exhaust flue to promote heat transfer from the combustion by-products via the exhaust flue to water contained in the water storage chamber for supplementing the heating of the water by the fuel burner. The baffle arrangement of the invention basically comprises an elongate substantially planar base having an upper end, a lower end, opposed lateral sides with a longitudinal centerline therebetween, and a plurality of exhaust-directing fins spaced longitudinally along opposite sides of the centerline. Each fin comprises a substantially planar body extending generally perpendicularly from the planar base and extending upwardly at an acute angle from adjacent the longitudinal centerline to adjacent a respective side. The fins are effective to deflect combustion by-products laterally outwardly within the exhaust flue to increase residence time therein and to promote contact with the exhaust flue for heat exchange. The fins are of selectively varying respective configurations and surface areas between the lower end and the upper end of the planar base for achieving a selectively controlled pressure drop within the exhaust flue. For example, in a contemplated embodiment, the fins may be of selected configurations generally increasing in respective surface area from the lower end to the upper end.

According to various contemplated embodiments of the invention, the planar base and the exhaust-directing fins may be formed integrally from a unitary body of sheet metal. The baffle arrangement may further comprise a pair of hanger tabs projecting laterally outwardly from the respective sides at the upper end of the planar base for engaging a top end of the exhaust flue to suspend the baffle arrangement within the flue. The planar base, the hanger tabs and the exhaust-directing fins may likewise be formed integrally from a unitary body of sheet metal. In such embodiments, each of the hanger tabs and exhaust-directing fins are formed by cuts and bends in the sheet metal body.

In a contemplated embodiment of the invention, the fins may be of various differing configurations. For example, selected fins may be configured as a generally circular segment. Other selected fins may be configured as an ovoid. Other selected fins may be configured with linear edges. In each case, the fins are preferably oriented at a common acute angle to the longitudinal centerline, e.g., an angle of substantially thirty degrees (30°).

It is further contemplated that selected fins may extend in one perpendicular direction from the planar base, and other selected fins may extend in an opposite perpendicular direction from the planar base. The fins may comprise a first sub-plurality of fins along one side of the planar base and a second sub-plurality of fins along the other side of the planar base, with each fin in the first sub-plurality and an adjacent fin in the second sub-plurality extending in the same perpendicular direction from the planar base. The fins in the first and second sub-pluralities may be arranged in alternation with one another longitudinally along the planar base. Selected fins may include a protuberance for contacting the exhaust flue for maintaining the baffle arrangement in a centered disposition within the exhaust flue.

According to another aspect of the invention, a sheet metal blank is provided for forming a baffle arrangement of the above-describe characteristics for disposition within a water heater exhaust flue to promote heat transfer to the exhaust flue from combustion by-products flowing within the exhaust flue. More particularly, the blank comprises an elongate substantially planar base having an upper end, a lower end, opposed lateral sides and a longitudinal centerline therebetween. A plurality of cuts are formed at longitudinal spacings along each lateral side for defining a plurality of exhaust-directing fins of selected configurations spaced longitudinally along opposite sides of the centerline and generally increasing in respective surface area from the lower end to the upper end of the planar base. A plurality of bend lines are defined between the planar base and the fins for bending each fin into a substantially planar body extending generally perpendicularly from the planar base and extending upwardly at an acute angle from adjacent the longitudinal centerline to adjacent a respective side.

DETAILED DESCRIPTION OF THE INVENTION

Referring now to the accompanying drawings, the present invention is herein illustrated and described in a representative contemplated embodiment installed in a typical form of residential fuel-burning storage-tank water heater. As the present invention has applicability and utility for use in any of numerous differing forms of fuel-burning storage-tank water heaters, the water heater shown in the accompanying drawings and described herein is only schematically and generically depicted, it being intended and to be explicitly understood that the present invention is not limited to the structure, operation or form of the depicted water heater. The water heater is illustrated and described herein merely as representative of the environment in which the present invention is contemplated for use, so as to provide an enabling disclosure and understanding of the present invention. Likewise, the baffle arrangement of the present invention as depicted in the accompanying drawings and described more fully herein is intended and to be understood as a representative contemplated embodiment of the present invention, but not as limiting to the scope, applicability and utility of the baffle arrangement as more broadly defined in the accompanying claims.

Figure 1:
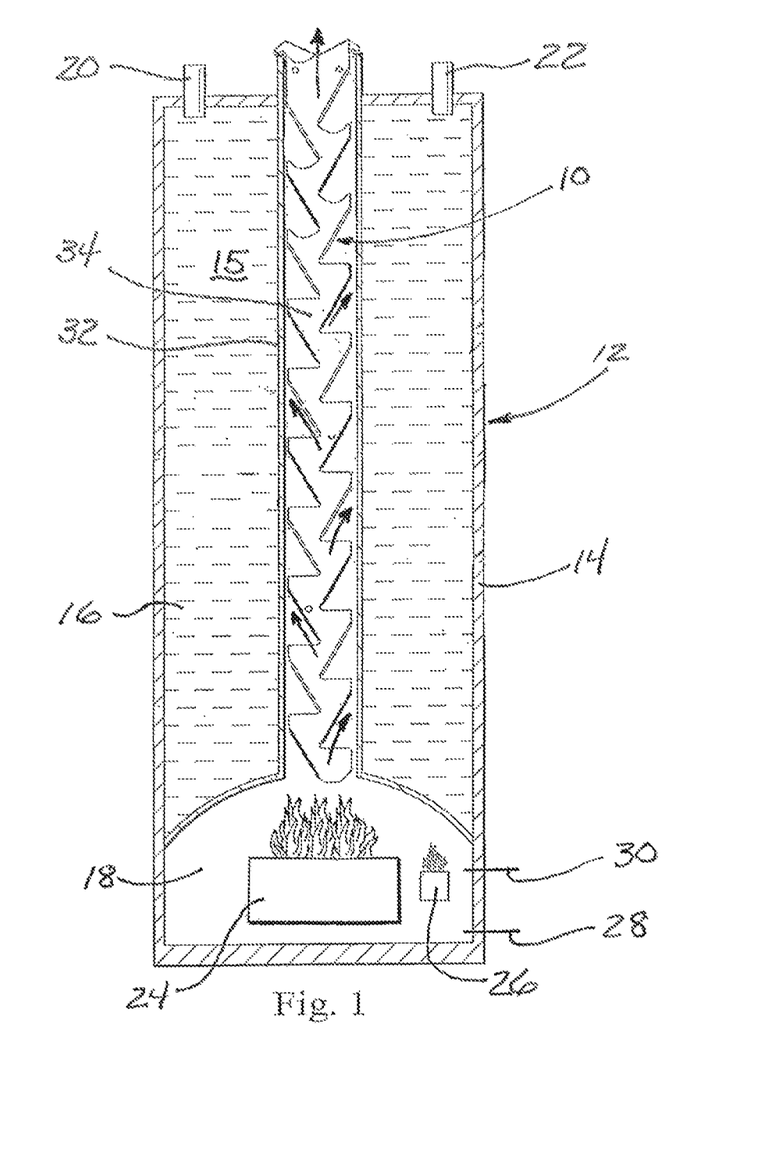
FIG. 1 is a schematic cross-sectional view taken vertically through a representative fuel-burning water heater equipped with a baffle arrangement in accordance with a contemplated embodiment of the present invention.

With reference initially to FIG. 1, the baffle arrangement of a contemplated embodiment the present invention is indicated overall at 10 in a storage-tank form of water heater, indicated overall at 12, fueled by natural or propane gas. Representatively, the water heater 12 has a housing 14, for example, in the form of an insulated outer cylindrical tank subdivided internally into a water storage chamber 16 of a size adapted to contain a defined quantity of water 15, with a combustion chamber 18 located immediately beneath the water storage chamber 16. A water inlet 20 extends through the housing 14 and opens into the water storage chamber 16 for delivering unheated water into the storage chamber for heating. Similarly, a water outlet 22 extends through the housing outwardly from the water storage chamber 16 for discharging heated water for use. The water inlet and outlet 20, 22 are shown only representatively but may, for example, be in the form of tubular pipes with external fittings for making plumbing connections to a typical pressurized home or commercial plumbing system.

A main gas-fired burner 24 together with a so-called pilot burner 26 are disposed within the combustion chamber 18 and connected via conventional supply lines with a natural or propane gas source 28 and a source of combustion air 30. Hereagain, these components are shown only schematically as their typical construction, configuration and operation are conventional and well-known. Basically, the pilot burner 26 is supplied by the gas and air lines 28, 30 to burn continuously to serve whenever needed to ignite the main burner 24 under a thermostatic control system (not shown) operative to monitor the temperature of the water contained in the water storage chamber 16 and to open the fuel and air lines 28, 30 to the main burner 24 for ignition by the pilot burner 26 whenever the prevailing water temperature in the chamber 16 is below a preset temperature, thereby to apply heat to the stored water.

Hot gaseous combustion by-products are produced by the gas being burned by both the pilot and main burners 24, 26 and are exhausted from the combustion chamber 18. For this purpose, a tubular exhaust flue 32 extends vertically from a lower end opening into the combustion chamber 18, upwardly through the water storage chamber 16, to an upper end opening outwardly from the housing 14 to continuously exhaust combustion by-products generated within the combustion chamber 18.

The heat generated by the pilot and main gas burners 24, 26 applied to the lower end of the water storage chamber 16 serves as the primary means of heat transfer to the water contained within the storage chamber 16. However, there remains a substantial amount of heat contained within the combustion by-products exhausted upwardly through the flue 32. The combustion by-products serve to heat the flue 32 and in turn to produce a degree of supplementary heat exchange via the flue 32 to the water within the storage chamber 16, but a significant proportion of the heat within the combustion by-products can be lost upwardly through the flue 32. Accordingly, it is known to provide varying means within the flue 32, with varying degrees of efficacy, to create turbulence in, or otherwise interrupt or slow, the natural upward laminar flow of the exhausting hot combustion by-products to increase residence time within the flue 32 and increase heat transfer thereby to the water within the storage chamber 16.

Figure 2:
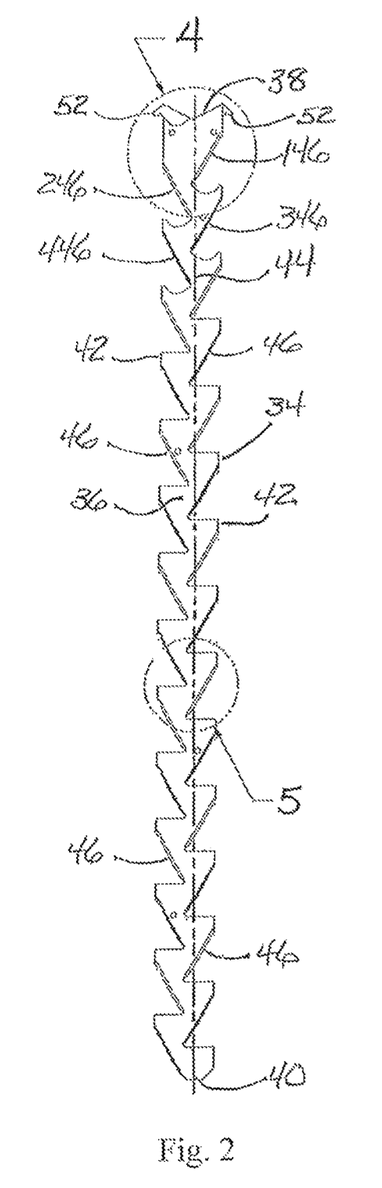
FIG. 2 is a front elevational view of the baffle arrangement of the FIG. 1.
Figure 3:
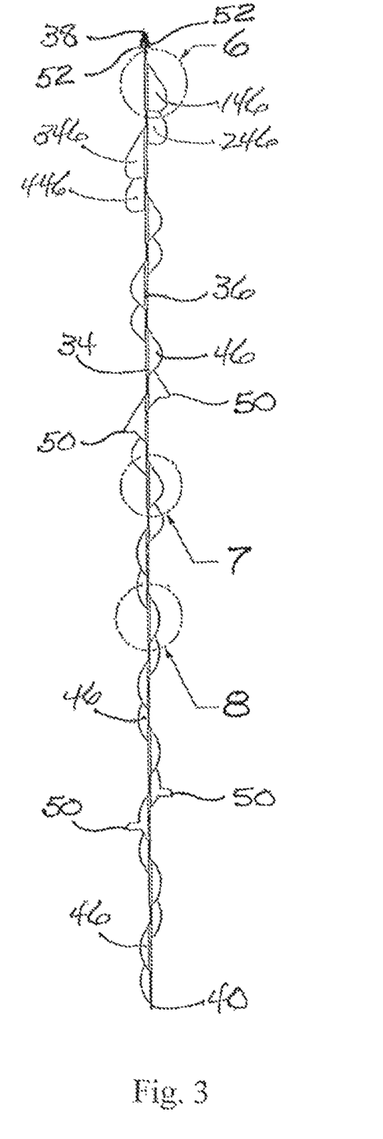
FIG. 3 is a side elevational view of the baffle arrangement of FIG. 2.
Figure 5:
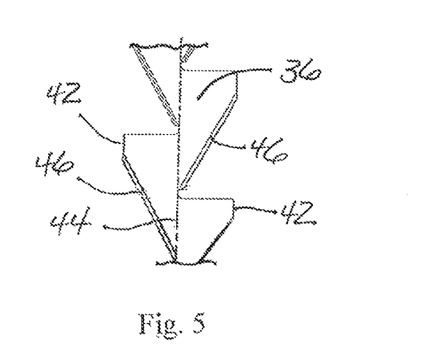
FIG. 5 is an enlarged-scale front elevational view of an intermediate portion of the baffle arrangement of FIGS. 2 and 3 as indicated at 5 in FIG. 2.

According to one or more embodiments of the present invention, an improved form of baffle arrangement, indicated overall at 34, is disposed within the exhaust flue 32 to promote heat transfer via the exhaust flue 32, as depicted in FIG. 1. The baffle arrangement 34 is additionally depicted outside of the exhaust flue 34 in front and side elevations in FIGS. 2 and 3, and basically comprises an elongate, substantially planar base body 36 having an upper end 38, a lower end 40, and opposite lateral sides 42, with a longitudinal centerline 44 extending lengthwise between the upper and lower ends 38, 40 centrally between the lateral sides 42. A plurality of exhaust-directing fins 46 are spaced longitudinally along the opposite sides of the centerline 44. The fins 46 are of selectively differing configurations, as more fully described hereinafter, but each fin 46 comprises a substantially planar body 48 which extends laterally outwardly from the planar base 36, e.g., generally perpendicularly in the depicted embodiment, as shown in FIGS. 2 and 3, and is oriented to extend upwardly (as viewed relative to the upper and lower ends 38, 40) and laterally outwardly (as viewed relative to the longitudinal centerline 44) at an acute angle, e.g., approximately thirty degrees (30°), from adjacent the longitudinal centerline 44 to adjacent a respective lateral side 42 of the base 36, as shown in FIGS. 2 and 5. The width of the planar base 36 between the lateral sides 42 closely approaches the interior diameter of the exhaust flue 32 and is substantially constant along the length of the baffle arrangement 34.

As best seen in FIG. 3, selected ones of the fins 46 extend from the planar base 36 in one perpendicular direction, i.e., from a forward face thereof, and other selected ones of the fins 46 extend in an opposite perpendicular direction from the planar base 36, i.e., rearwardly from a rearward face thereof. In a contemplated embodiment, the number of rearwardly-projecting fins 46 and the number of forwardly-projecting fins 46 are equal or substantially equal. For example, as shown in FIG. 2, the fins 46 along one lengthwise side of the planar base 36 comprise a first sub-plurality of fins and the fins 46 along the other side of the planar base comprise a second sub-plurality of fins, with the fins of the first and second sub-pluralities being arranged in alternation with one another longitudinally along the base, i.e., fins of one sub-plurality are disposed laterally between adjacent fins of the other sub-plurality. As viewed lengthwise along the planar base 36, the fins 46 project rearwardly and forwardly in alternating pairs, with each fin 46 in one sub-plurality and a laterally adjacent fin 46 in the other sub plurality extending in the same perpendicular direction from the planar base. That is, as shown in FIGS. 2 and 3, the uppermost fin 146 in the sub-plurality at one side of the base and the adjacent uppermost fin 246 in the sub-plurality at the other side of the base each project perpendicularly forwardly, the next pair of laterally-adjacent fins 346, 446 in the two sub-pluralities each project perpendicularly rearwardly, and so on along the full length of the planar base 36.

Figure 4:
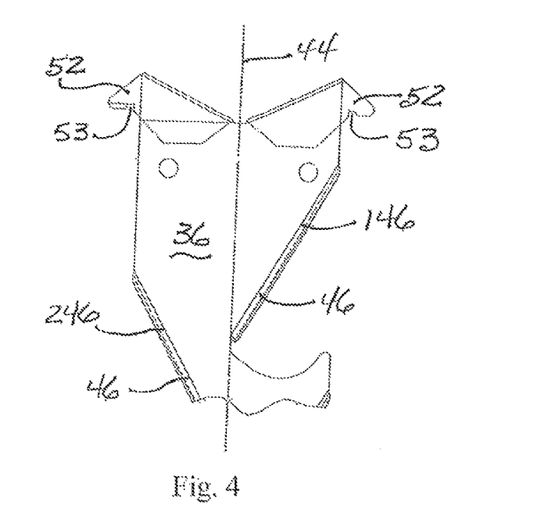
FIG. 4 is an enlarged-scale front elevational view of the upper end portion of the baffle arrangement of FIGS. 2 and 3 as indicated at 4 in FIG. 2, showing the hanger tabs thereof.

As best seen in FIG. 4, the baffle arrangement 34 comprises a pair of downwardly folded hangar tabs 52 projecting laterally outwardly from opposite sides of the upper end 38 of the base 36. Each of the hangar tabs 52 is formed with a downwardly facing recessed notch 53 to engage and rest securely upon a top end edge of the exhaust flue 32, as shown in FIG. 1, to suspend the baffle arrangement downwardly therefrom in a centered disposition within the flue 32. As shown in FIG. 3, selected ones of the forwardly-projecting fins 46 and selected ones of the rearwardly-projecting fins 46 at longitudinal spacings along the planar base 36 may be formed with a protuberance 50 extending further outwardly in a perpendicular direction from the base 36 to contact the interior wall of the exhaust flue 32 to prevent the suspended baffle arrangement from unduly shifting forwardly or rearwardly within the flue 32, thereby to maintain the baffle arrangement in a centered disposition within the flue 32.

Owing to their planar body configuration, angular orientation, and alternating forward-rearward projecting arrangement as above-described, the fins 46 serve to effectively deflect combustion by-products rising within the flue 32 laterally outwardly therein, as indicated by directional arrows in FIG. 1. As a result, the combustion by-products are retained within the flue 32 for an increased residence time and the combustion by-products are caused to directly contact repeatedly against the inner wall surface of the flue 32 to promote enhanced heat exchange through the flue 32.

According to one feature of the presently described embodiments, the fins 46 are of differing surface area sizes as a result of their differing configurations and the fins 46 are arranged to be of selectively varying surface area sizes between the upper and lower ends 38, 40 of the base 36. For example, in the depicted embodiment, the fins 46 are of an overall progressively increasing surface area sizes from the lower end 40 of the base 36 to the upper end 38 of the base 36, as seen in FIG. 3. The differing surface area configurations and sizes are selected to achieve a correspondingly selectively controlled pressure drop within the exhausting combustion by-products over the length of the exhaust flue 32, so that the increased residence time of the combustion by-products within the flue 32 and the enhanced heat exchange is not at the disadvantage of impeded exhaust flow. In turn, heat loss which commonly occurs in conventional water heaters when in stand-by mode, i.e., holding a body of contained water at a set point temperature, can be minimized. It is known in conventional water heater operation that in stand-by mode heat transfer can occur from the contained water into the exhaust flue and then lost outwardly through the flue. By the selective control of the pressure drop upwardly along the flue 32 achievable with the present baffle arrangement 34, the exhaust flow characteristics and behavior of the exhausting combustion by-products can be modulated so as to minimize heat loss resulting from such reverse heat transfer.

Figure 6:
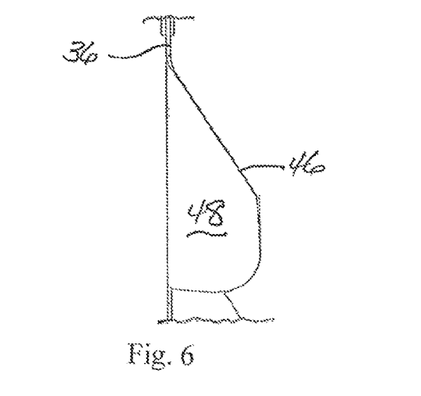
FIG. 6 is an enlarged-scale side elevational view of a portion of the baffle arrangement of FIGS. 2 and 3 as indicated at 6 in FIG. 3, showing the configuration of one form of exhaust-directing fin.
Figure 7:
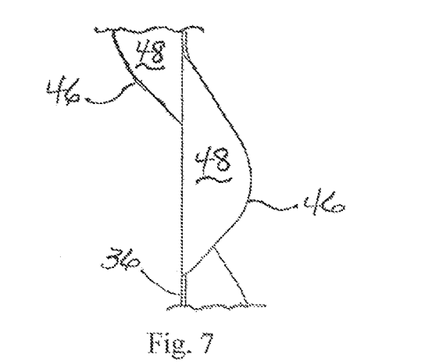
FIG. 7 is an enlarged-scale side elevational view of another portion of the baffle arrangement of FIGS. 2 and 3 as indicated at 7 in FIG. 3, showing the configuration of another exhaust-directing fin.
Figure 8:
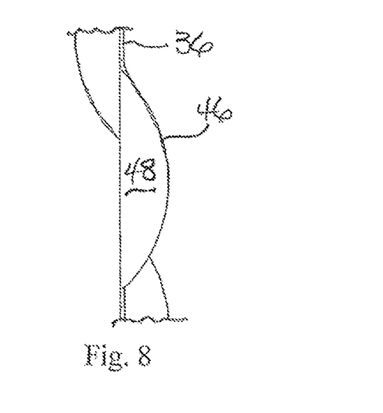
FIG. 8 is an enlarged-scale side elevational view of another portion of the baffle arrangement of FIGS. 2 and 3 as indicated at 8 in FIG. 3, showing the configuration of another exhaust-directing fin.

As depicted in FIG. 3, with additional reference to FIGS. 6, 7 and 8, three differing representative configurations for the fins 46 are indicated at 6, 7 and 8 in FIG. 3 and shown in enlarged side elevational detail in FIGS. 6, 7 and 8, respectively. For approximately the lower one-third of the overall length of the baffle arrangement 34 adjacent its lower end 40, the fins 46 are in the configuration of circular segments, as shown in greater detail in FIG. 8, which fins have the smallest surface area of all of the fins 46 along the baffle arrangement 34. Along an intermediate extent of the overall length of the baffle arrangement 34, the fins 46 are of an ovoid configuration, as shown in greater detail in FIG. 7, which fins are of an incrementally greater surface area. Adjacent the upper end 38 of the baffle arrangement, the fins 46 have linear edges in a generally trapezoidal configuration, as shown in greater detail in FIG. 6, which fins have the largest surface area of all of the fins 46 along the baffle arrangement 34. Owing to the uniform width of the planar base 36 between the lateral sides 42, a uniform distance is maintained along the length of the baffle arrangement 34 between the uppermost tip end of each fin 46 adjoining its respective lateral side 42 and the interior wall of the exhaust flue 32.

However, while these specific configurations and arrangement for the fins 46 are depicted in the contemplated embodiment, it is to be expressly understood that various other configurations, geometrical or otherwise, and various other arrangements of the fins 46, are also contemplated to be possible and the present invention is not intended nor to be construed as limited to such particular configurations and arrangement. For example, the fins 46 could be of more than three varying configurations and sizes, and/or specially configured fins 46 could be selectively located at strategic positions along the base 36 to "fine tune" the exhaust flow characteristics and behavior of the combustion by-products. It is further contemplated that every fin 46 could vary in configuration and/or size from one to the next along the full length of the baffle arrangement.

Likewise, while the fins 46 in the illustrated embodiment are arranged to be of overall generally increasing respective surface area sizes from the lower end 40 to the upper end 38 of the base 36, it is contemplated that other differing arrangements and distributions of the fins 46 may be employed. For example, while the baffle arrangement 34 is depicted in a water heater 12 whose exhaust flue 32 is naturally drafted, it is also possible that embodiments of the baffle arrangement 34 would be suitable for use in water heater exhaust flues utilizing a controlled exhaust damper, a fan, or other powered or supplementary exhaust means and, in such environments, it may be desirable or advantageous to configure the baffle arrangement 34 with fins 46 of overall decreasing or otherwise selectively varying respective surface area sizes from the lower end 40 to the upper end 38 of the base 36.

Figure 9:
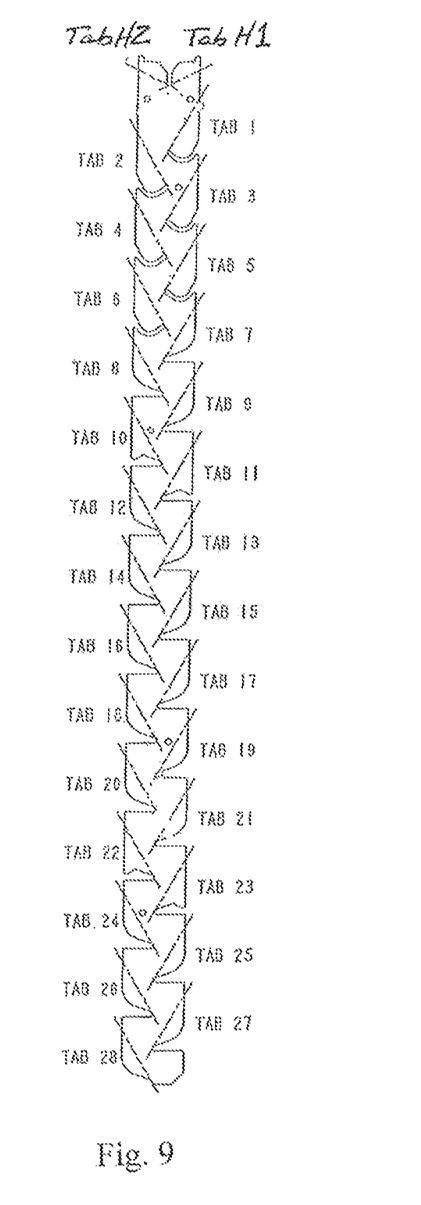
FIG. 9 is a front elevational view of a sheet metal blank adapted for bending into the form of the baffle arrangement of FIGS. 2 and 3.

According to another aspect of the of the presently described embodiments, the entire baffle arrangement 34, i.e., the planar base 36, all of the exhaust-directing fins 46, and the hangar tabs 52, are formed integrally from a unitary body of sheet metal, e.g., stainless steel, carbon steel, aluminized steel, or any other suitable sheet metal adapted for stamping, cutting and bending into the above-described configuration. FIG. 9 depicts a flat planar blank stamped or cut, e.g., by any suitable conventional means, from metal sheeting for forming the baffle arrangement 34 of the present invention.

In FIG. 9, the cuts made to form each exhaust-directing fin 46 define tabs 1-28 with broken lines indicating bend lines to form the respective tabs into the fins 46. As will be seen, each of tabs 1-28 is cut in one respective lateral side 42 substantially to the longitudinal centerline 44 running lengthwise through the blank and each such tab is bent along a line extending from the centerline 44 to the laterally outward side 42 at substantially a thirty degree (30°) acute angle to the centerline 44. Laterally adjacent tabs at the opposite sides of the blank are bent forwardly and rearwardly in alternating pairs as above-described, i.e., tabs 1 and 2 are bent forwardly at substantially a perpendicular angle (preferably an angle of 88°) to the planar base 36 of the blank, thereby forming fins 146, 246, tabs 3 and 4 are bent rearwardly at substantially the same perpendicular angle, thereby forming fins 346, 446, tabs 5 and 6 are bent forwardly, tabs 7 and 8 are bent rearwardly, and so on for the length of the blank, thereby forming the remaining fins 46.

Likewise, the cuts made to form hangar tabs 52 define tabs H1 and H2, with broken lines indicating bend lines to form the tabs into the hangar tabs 52. The tabs H1 and H2 are bent downwardly at a larger angle to the longitudinal centerline 44, e.g., an angle of substantially 64°, into substantially overlying abutting relation to the planar base 36, whereby an outward portion of the uppermost edge of each tab H1 and H2 extends laterally beyond the adjacent side 42 to form the hangar tabs 52.

The baffle arrangement of the present embodiments will accordingly be understood to provide significant improvements and advantages over baffles known to be used in flues in fuel-fired water heaters. In the present embodiments, the entirety of the baffle arrangement can be stamped or cut and bent from a single unitary piece of sheet metal. Welding of directional fins and the associated cost thereof is avoided. A single tool may potentially be employed to cut or stamp the baffle arrangement and another tool to bend the baffle arrangement, and the weight of the baffle arrangement can be minimized. In addition, various geometric parameters for the exhaust-directing fins, e.g. shape, size, surface area, bend angles, etc. can be selectively varied as desired to fine tune the exhaust flow and heat transfer characteristics and functionality of the baffle arrangement. For example, the fins 46 in the representative exemplary embodiment above-described may be of selectively varying configurations which generally increase in respective surface area from the lower end to the upper end of the baffle arrangement, which enables heat transfer functionality to be adjusted at differing locations along the length of the baffle arrangement and the overall pressure drop across the height of the exhaust flue to be selectively controlled. In addition, by providing the fins with the largest surface area adjacent the upper exit end of the exhaust flue, the baffle arrangement assists in limiting heat loss from the water heater when in standby mode.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A fuel-burning water heater comprising:
   a housing defining a water storage chamber for containing a quantity of water to be heated and a combustion chamber located beneath the water storage chamber;

an inlet extending through the housing into the storage chamber for delivering water into the storage chamber for heating;

an outlet extending through the housing from the storage chamber for discharging heated water from the storage chamber;

a fuel burner disposed in the combustion chamber for receiving and combusting a mixture of fuel and air for heating water contained in the water storage chamber;

an exhaust flue extending from the combustion chamber vertically through the water storage chamber and outwardly from the housing for exhausting combustion by-products generated by combustion of the fuel-and-air mixture, and a baffle arrangement disposed within the exhaust flue to promote heat transfer from the combustion by-products via the exhaust flue to water contained in the water storage chamber for supplementing the heating of the water by the fuel burner, the baffle arrangement comprising:

an elongate planar base having an upper end, a lower end, opposed lateral sides and a longitudinal centerline therebetween, and a plurality of fins that are exhaust-directing and spaced longitudinally along opposite sides of the centerline, each fin comprising a planar body extending perpendicularly from the elongate planar base and extending upwardly at an acute angle from adjacent the longitudinal centerline to adjacent a respective side, the plurality of fins being effective to deflect combustion by-products laterally outwardly within the exhaust flue to increase residence time therein and to promote contact with the exhaust flue for heat exchange, the plurality of fins being of selectively varying respective configurations and surface areas between the lower end and the upper end of the elongate planar base for achieving a selectively controlled pressure drop within the exhaust flue, wherein first selected fins of the plurality of fins are circular, wherein second selected fins of the plurality of fins are ovoid, wherein third selected fins of the plurality of fins have linear edges, and wherein each of the first selected fins has less surface area than each of the second selected fins and each of the third selected fins, and wherein each of the second selected fins has less surface area than each of the third selected fins.

2. A fuel-burning water heater according to claim 1, wherein the plurality of fins are increasing in respective surface area from the lower end to the upper end of the elongate planar base.

3. A fuel-burning water heater according to claim 1, wherein the elongate planar base and the plurality of fins are formed integrally from a unitary body of sheet metal having a uniform width prior to forming the plurality of fins.

4. A fuel-burning water heater according to claim 1, wherein the baffle arrangement further comprises a pair of hanger tabs projecting laterally outwardly from the opposed lateral sides at the upper end of the elongate planar base for engaging a top end of the exhaust flue to suspend the baffle arrangement within the flue.

5. A fuel-burning water heater according to claim 4, wherein the elongate planar base, the pair of hanger tabs and the plurality of fins are formed integrally from a unitary body of sheet metal having a uniform width prior to forming the pair of hanger tabs and the plurality of fins.

6. A fuel-burning water heater according to claim 5, wherein each of the pair of hanger tabs and the plurality of fins are formed by cuts and bends in the unitary body of sheet metal.

7. A fuel-burning water heater according to claim 3, wherein each of the plurality of fins are formed by cuts and bends in the unitary body of sheet metal.

8. A fuel-burning water heater according to claim 1, wherein the plurality of fins are oriented at an angle of thirty degrees (30°) to the longitudinal centerline.

9. A fuel-burning water heater according to claim 1, wherein the plurality of fins comprise a first sub-plurality of fins extending in a perpendicular direction from the elongate planar base, and a second sub-plurality of fins extending in an opposite perpendicular direction from the elongate planar base.

10. A fuel-burning water heater according to claim 9, wherein the plurality of fins comprise a third sub-plurality of fins along one side of the elongate planar base and a fourth sub-plurality of fins along the other side of the elongate planar base, each fin in the third sub plurality and an adjacent fin in the fourth sub plurality extending in the perpendicular direction from the elongate planar base.

11. A fuel-burning water heater according to claim 10, wherein the fins in the third and fourth sub-pluralities are arranged in alternation with one another longitudinally along the elongate planar base.

12. A fuel-burning water heater according to claim 1, wherein the plurality of fins comprise a fifth sub-plurality of fins that include a protuberance for contacting the exhaust flue for maintaining the baffle arrangement in a centered disposition within the exhaust flue.

13. A baffle arrangement for disposition within an exhaust flue to promote heat transfer to the exhaust flue from combustion by-products flowing within the exhaust flue, the baffle arrangement comprising:

an elongate planar base having an upper end, a lower end, opposed lateral sides and a longitudinal centerline therebetween, and a plurality of fins that are exhaust-directing and spaced longitudinally along opposite sides of the centerline, each fin comprising a planar body extending perpendicularly from the elongate planar base and extending upwardly at an acute angle from adjacent the longitudinal centerline to adjacent a respective side, the plurality of fins being effective to deflect combustion by-products laterally outwardly within the exhaust flue to increase residence time therein and to promote contact with the exhaust flue for heat exchange, the plurality of fins being of selectively varying respective configurations and surface areas between the lower end and the upper end of the elongate planar base for achieving a selectively controlled pressure drop within the exhaust flue, wherein first selected fins of the plurality of fins are circular, wherein second selected fins of the plurality of fins are ovoid, wherein third selected fins of the plurality of fins have linear edges, and wherein each of the first selected fins has less surface area than each of the second selected fins and each of the third selected fins, and wherein each of the second selected fins has less surface area than each of the third selected fins.

14. A baffle arrangement according to claim 13, wherein the plurality of fins are increasing in respective surface area from the lower end to the upper end of the elongate planar base.

15. A baffle arrangement according to claim 13, wherein the elongate planar base and the plurality of fins are formed integrally from a unitary body of sheet metal having a uniform width prior to forming the plurality of fins.

16. A baffle arrangement according to claim 13, wherein the baffle arrangement further comprises a pair of hanger tabs projecting laterally outwardly from the opposed lateral sides at the upper end of the elongate planar base for engaging a top end of the exhaust flue to suspend the baffle arrangement within the flue.

17. A baffle arrangement according to claim 16, wherein the elongate planar base, the pair of hanger tabs and the plurality of fins are formed integrally from a unitary body of sheet metal having a uniform width prior to forming the pair of hanger tabs and the plurality of fins.

18. A baffle arrangement according to claim 17, wherein each of the pair of hanger tabs and the plurality of fins are formed by cuts and bends in the unitary body of sheet metal.

19. A baffle arrangement according to claim 15, wherein each of the plurality of fins are formed by cuts and bends in the unitary body of sheet metal.

20. A baffle arrangement according to claim 13, wherein the plurality of fins are oriented at an angle of thirty degrees (30°) to the longitudinal centerline.

21. A baffle arrangement according to claim 13, wherein the plurality of fins comprise a first sub-plurality of fins extending in a perpendicular direction from the elongate planar base, and a second sub-plurality of fins extending in an opposite perpendicular direction from the elongate planar base.

22. A baffle arrangement according to claim 21, wherein the plurality of fins comprise a third sub plurality of fins along one side of the elongate planar base and a fourth sub-plurality of fins along the other side of the elongate planar base, each fin in the third sub-plurality and an adjacent fin in the fourth sub plurality extending in the perpendicular direction from the elongate planar base.

23. A baffle arrangement according to claim 22, wherein the fins in the third and fourth sub-pluralities are arranged in alternation with one another longitudinally along the elongate planar base.

24. A baffle arrangement according to claim 13, wherein the plurality of fins comprise a fifth sub-plurality of fins that include a protuberance for contacting the exhaust flue for maintaining the baffle arrangement in a centered disposition within the exhaust flue.

* * * * *